US011964297B2

(12) United States Patent
Brewington et al.

(10) Patent No.: US 11,964,297 B2
(45) Date of Patent: Apr. 23, 2024

(54) CAULK GUN WITH A SET OF SHORTENED RODS

(71) Applicant: Richard Brewington, Elletsville, IN (US)

(72) Inventors: Richard Brewington, Ellettsville, IN (US); Adam Sturgeon, Monticello, IN (US); Ryan Krouse, Van Buren, OH (US); Jakob Quasebarth, Monon, IN (US)

(73) Assignee: Richard Brewington, Ellettsville, IN (US)

( * ) Notice: Subject to any disclaimer, the term of this patent is extended or adjusted under 35 U.S.C. 154(b) by 0 days.

(21) Appl. No.: 17/662,230

(22) Filed: May 5, 2022

(65) Prior Publication Data

US 2022/0355333 A1 Nov. 10, 2022

Related U.S. Application Data

(60) Provisional application No. 63/184,743, filed on May 5, 2021.

(51) Int. Cl.
*B05C 17/01* (2006.01)
*B05C 17/005* (2006.01)

(52) U.S. Cl.
CPC .... *B05C 17/0116* (2013.01); *B05C 17/00576* (2013.01)

(58) Field of Classification Search
CPC ...................... B05C 17/0116; B05C 17/00578
See application file for complete search history.

(56) References Cited

U.S. PATENT DOCUMENTS

| | | | | | | |
|---|---|---|---|---|---|---|
| 2,128,254 | A | * | 8/1938 | Kile | A61M 3/00 | 222/386 |
| 3,248,950 | A | * | 5/1966 | Pursell | B01L 3/0224 | 73/864.18 |
| 3,726,440 | A | * | 4/1973 | Deeb | B05C 17/0123 | 222/323 |
| 4,299,329 | A | * | 11/1981 | Keiji | B65D 17/08 | 222/326 |
| 4,444,335 | A | * | 4/1984 | Wood | A61M 3/00 | 222/43 |
| 4,654,035 | A | * | 3/1987 | Ando | A61M 5/3158 | 604/210 |
| 4,750,373 | A | * | 6/1988 | Shapiro | B01L 3/0234 | 73/864.18 |
| 4,785,629 | A | * | 11/1988 | Ennis, III | B60T 17/222 | 188/352 |
| 4,994,065 | A | * | 2/1991 | Gibbs | B05C 17/0123 | 604/209 |
| 5,137,184 | A | * | 8/1992 | Jackson | B05C 17/00596 | 222/569 |

(Continued)

*Primary Examiner* — Paul R Durand
*Assistant Examiner* — Randall A Gruby
(74) *Attorney, Agent, or Firm* — Peter Willis

(57) ABSTRACT

This invention is a gun shaped device used in the application of caulk, paste and or other semi solid high viscosity fluids. The device contains a barrel portion for the tube to be inserted into, and a plunger portion with a flat round metal piece with a fitting that attaches to a set of shortened rods. The set of shortened rods acts as a plunger and goes through a guide toward the back of the handle. The barrel can be shortened for use of smaller tubes of caulk.

7 Claims, 5 Drawing Sheets

(56) References Cited

U.S. PATENT DOCUMENTS 5,211,312 A * 5/1993 Chang .................... B05C 17/01 222/391
5,263,614 A * 11/1993 Jacobsen ................ B05C 17/01 222/391
5,390,831 A * 2/1995 Schneider ............... B05C 17/01 222/391
5,501,374 A * 3/1996 Laufer ................ B05C 17/0123 222/391
5,529,225 A * 6/1996 Chang .................... B05C 17/01 222/391
6,050,453 A * 4/2000 Kelders ................. B05B 12/002 222/323
6,089,412 A * 7/2000 Snell ...................... B05C 17/01 222/391
6,220,485 B1 * 4/2001 Chang .................... B05C 17/01 222/327
6,264,071 B1 * 7/2001 Dentler ................... B05C 17/01 222/326
6,286,729 B1 * 9/2001 Lin ....................... G01F 11/026 222/326
6,454,136 B1 * 9/2002 Evans .................... B05C 17/01 222/326
6,976,288 B1 * 12/2005 Luca ....................... E05F 3/108 16/86 A
7,011,238 B1 * 3/2006 Sung ................... B05C 17/0123 222/391
8,342,371 B2 * 1/2013 Helmenstein ..... B05C 17/00576 222/386
8,381,950 B2 * 2/2013 Veltrop ............ B05C 17/00576 222/391
8,561,848 B2 * 10/2013 Gardner ................ B05B 15/628 222/323
8,919,617 B2 * 12/2014 Foley .................... B05C 17/005 222/326
9,630,204 B2 * 4/2017 Hung ................ B05C 17/00576
9,827,588 B2 * 11/2017 Hung ...................... B05C 17/01
11,517,935 B1 * 12/2022 Li ....................... B05C 17/0126
2005/0196287 A1 * 9/2005 Olich ................ A61M 5/14216 222/386
2009/0045227 A1 * 2/2009 Abudi ..................... B05C 17/01 222/326
2015/0034681 A1 * 2/2015 Peres ................. B05C 17/0133 222/326
2022/0355333 A1 * 11/2022 Brewington ...... B05C 17/00576

* cited by examiner

CAULK GUN WITH A SET OF SHORTENED RODS

BACKGROUND

Field of Invention

The present invention is related to the use and delivery of a semisolid paste via a gun like device which can squeeze the paste out of the tube at a rate consistent with the desires of the user. More particularly, the present invention is related to extendable plungers and the triggers for them.

Description of the Related Art

Prior art designs for caulk guns are a well-known feature of the construction marketplace. They can be used to seal cracks and crevices, to permanently fix a piece of glass into its frame, or to keep a set of shelves from moving. They generally allow for the placement of a rigid tube or a softer tubular bag of a high viscosity liquid or paste in the barrel of the device and eject the paste through a nozzle at the front end.

A typical hand operated caulk gun is exemplified in FIG. 1 with a rigid piston rod (6) and a flat round plunger (41) slidably placed in a channel extending from a hole in the back of the handle to the back of the container of the said tube or tubular bag of paste. The tube housing (5) is generally sized to fit either a 9 oz or a 29 oz cylindrical tube of paste. The operation of the typical commercially available caulk gun generally involves the advancement of a rigid metal rod with a flat round plunger (41) at the end that can slide into the barrel, reducing the volume of caulk in said tube of paste. This caulk gun starts with a full tube of paste or viscous liquid and the piston rod fully extended such that the clearance required for the caulk gun is more than double the length of said tube of viscous liquid plus the length of the nozzle, and the handle/trigger housing. It has a tube housing (5) in which said tube is placed into with the nozzle pointed forward to the far end of the barrel. The ridged piston rod generally has a hook on the end to allow the user to either turn the angle of the piston rod to release the pressure on said tube of caulk or to quickly pull the plunger out when the tube is empty.

The trigger handle (7) is used to engage the drive grip (8) and move the piston (6) forward to deliver the caulk in a bead of a consistent size and width. When the piston (6) is fully retracted the length of the caulk gun is nearly 2× the length of the tube housing (5) and the trigger housing (9). The drive grip and the trigger handle are resisted by a spring that is in a rest position when the trigger handle is released.

SUMMARY OF THE INVENTION

The current invention is a modified caulking gun for use in areas with a small amount of clearance for the space in front of the joint to be sealed. The caulk gun has the features, a shortened tube housing to fit a cylindrical tube of caulk that is smaller than the standard 9 oz tube, a segmented plunger, a handle, a trigger, a frictional tab with the means to release the pressure on the plunger, and a cut out area in the body for the insertion of the caulking tube.

The segmented plunger will comprise a flat round metal piece that is attached on the end of a set of short rods that can be quickly combined or separated to form a rod of variable length. Disposed at the back of the handle is the thumb lock and release mechanism that prevents shortened rods from being pushed all the way into the caulk gun. The thumb lock will work in conjunction with a groove positioned near one end of a shortened rod.

The benefits of this invention include but are not limited to the unencumbered use of the caulking gun in restricted space environments. A smaller caulking gun with greater clearance at the rear of the caulk gun allows the caulk to be laid at more precise angles than a larger caulking gun, and the more versatile plunger allows for a more convenient use of the space directly behind the gun handle.

DETAILED DESCRIPTION

Figure 2:
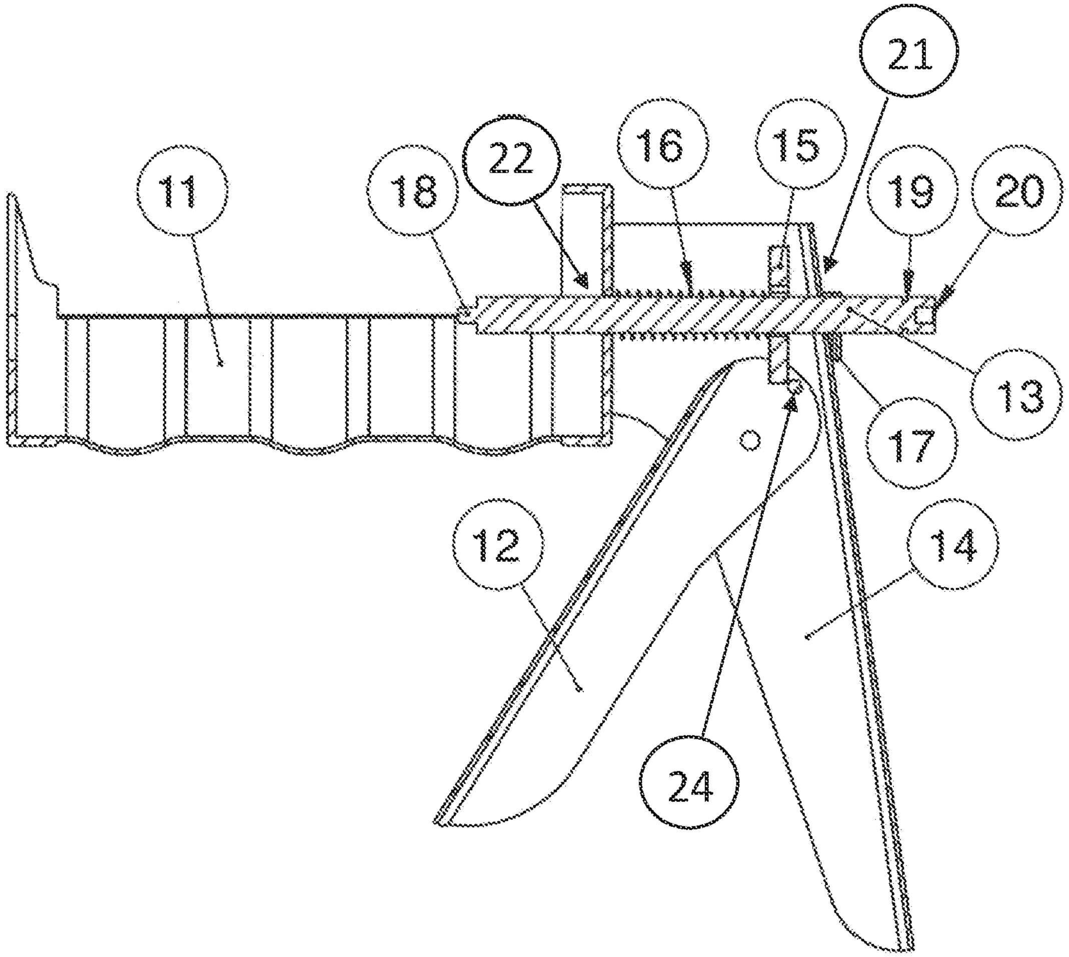
FIG. 2 is a cut out view of the caulk gun, the trigger handle fully forward.

Referring now to the invention shown in FIG. 2 a cutout view of a caulking gun shows a view of said caulking gun with a tube housing (11) to fit a shorter tube of caulk (about 4-7 oz is optimal), and a segmented plunger assembly with a set of shortened rods and a round disk (not shown) that attaches to the male portion of the shortened rods (18). This view shows the path of the shortened rod (13) that passes through a spring (16), two holes in the handle, and a frictional tab (15). The caulk gun is shown with a handle (14) and a trigger (12) attached at one point, and a frictional tab (15) attached to the trigger at a different point. The rear of the shortened tube housing (11) attaches to the front of the handle (14). In this embodiment the shortened tube housing (11) is attached with a metal-to-metal connection to the front side of the handle with connections that can range from welding a sharp edge to the shortened tube housing (11) or the use of a folded piece of metal, or the use of screws, bolts, or rivets.

Figure 1:
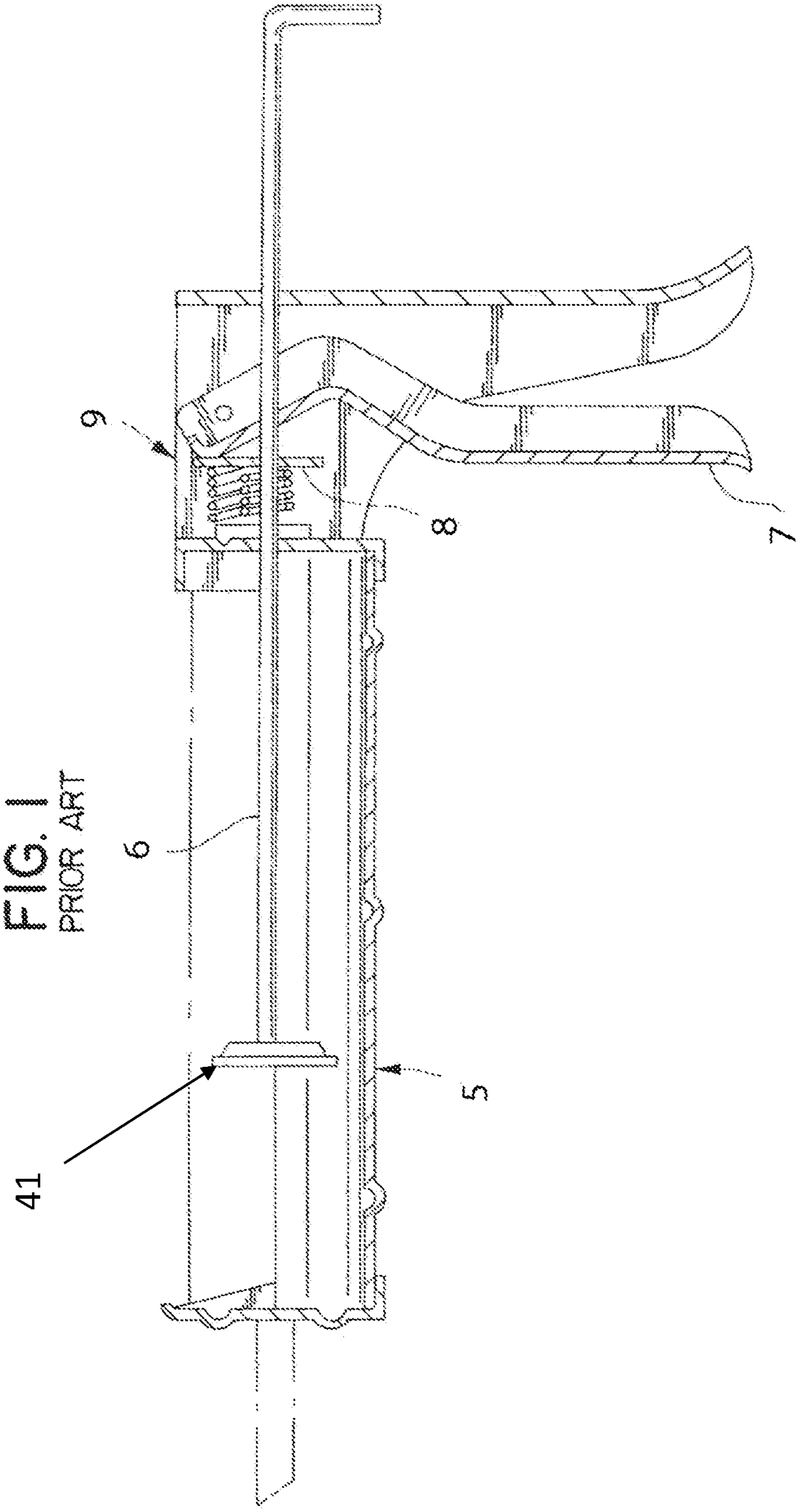
FIG. 1 PRIOR ART
FIG. 1 is a diagram of a prior art caulk gun with a rigid smooth piston rod.
Figure 3:
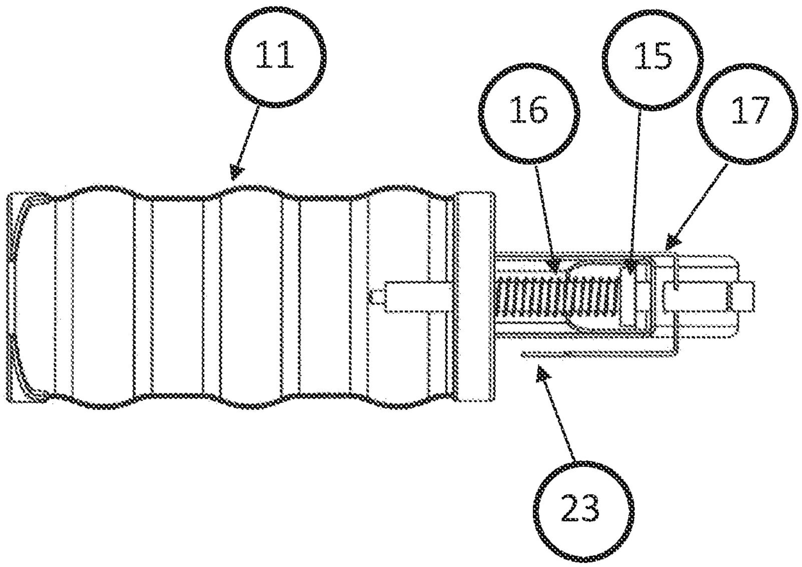
FIG. 3 is a top view of the caulk gun, the trigger handle fully forward.
Figure 4:
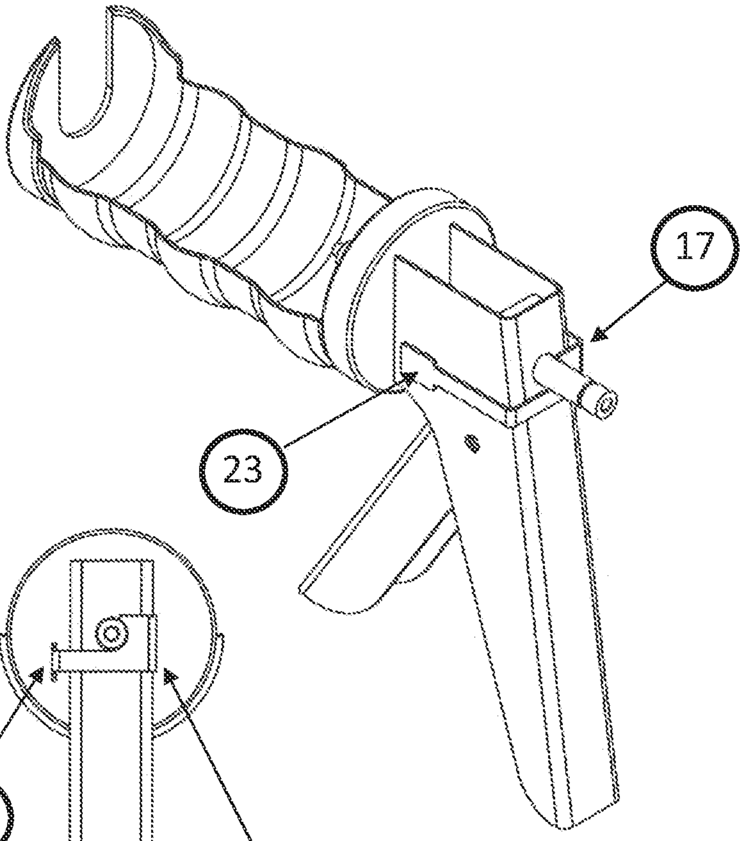
FIG. 4 is a perspective view of the caulk gun.

Further referring now to the invention shown in FIG. 2-5, a shortened rod (13) or a set of the shortened rods (13) passes through a hole in the back of the handle (21), the frictional tab (15), a spring (16) and the hole in the back of the shortened tube housing (22). At the front of the first shortened rod is a pan shaped disk (not shown, but similar to feature 5 of FIG. 1) that can screw onto a threaded male connection (18). Once attached to the pan shaped disk, a slow steady insertion of the shortened rod (13) by the action of the trigger (12) and the frictional tab (15) is stopped by the action of a thumb lock release mechanism (17) near the hole in the back of the handle (21) on the groove (19) on the back end of the shortened rod (13). As seen in FIG. 2-4 the shortened rod (13) is longer than the distance from the hole in the back of the handle (21) to the hole in the back of the shortened tube housing (22).

Referring now to the invention shown in FIG. 3 with a top view of the caulk gun. This view shows the thumb lock/release mechanism (17) is attached to the back side of the shortened tube housing (11). The thumb lock/release mechanism (17) is a thin strip that follows along the edge of the handle with the axis of the caulking gun, wrapping around the back of the handle (14) ending with a mechanical button (23). The thumb lock/release mechanism is under tension and when aligned will engage with the groove (19) to stop the shortened rod (13) from moving until pressure is applied to the mechanical button (23) on the front side of the handle. With the shortened rod (13) or segmented plunger assembly held by the thumb lock/release mechanism another male connection of another of the shortened rods can be added to the female connection (20) of the shortened rod (13). In one embodiment, the combination of the thumb lock release mechanism and the thumb lock groove will lock the shortened rod into place allowing for the male connection (18) for a second shortened rod to be screwed into the female connection (20) in the back of the shortened rod (13). The female connection (20) is also threaded such that it may join with the male connection.

Further referring now to the invention shown in FIG. 2-5 when the trigger (12) is pulled, the frictional tab (15) will engage. The frictional tab (15) will turn slightly upon a trigger pull with the top and bottom collapsing onto the segmented plunger assembly, acting like a pincher. The frictional tab (15) has a levered connection (24) with the trigger (12) which on a trigger pull will move the shortened rod (13) forward with significant leverage. The trigger (12) works on a different axis of rotation versus the levered connection (24) with the trigger. These elements working together smooth the forward motion of the plunger, giving a smooth and steady supply of caulk or adhesive. The tube housing (11) holds the outside of the shortened caulking tube in place.

Figure 5:
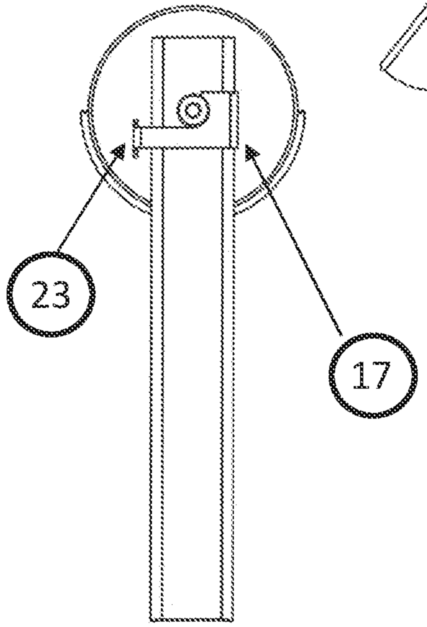
FIG. 5 is a back view of the caulk gun.

Further referring now to the invention shown in FIG. 4-5. FIG. 4 a perspective view of the caulk gun, and FIG. 5 a back view of the caulk gun, best show the action of the mechanical button (23) when pressed. When the mechanical button (23) is pressed the thumb lock/release mechanism (17) acts against the spring action of the metal strip releasing the shortened rod (13).

Further referring now to the invention shown in FIG. 2, the plunger will comprise a flat round metal piece that is attached to the male end of the shortened rod (13). When the shortened rod is inserted into the handle it is surrounded by elements in the following order, the hole in the back of the tube housing (22), the spring (15), the frictional tab (15), and the hole at the back of the handle (21).

Figure 6:
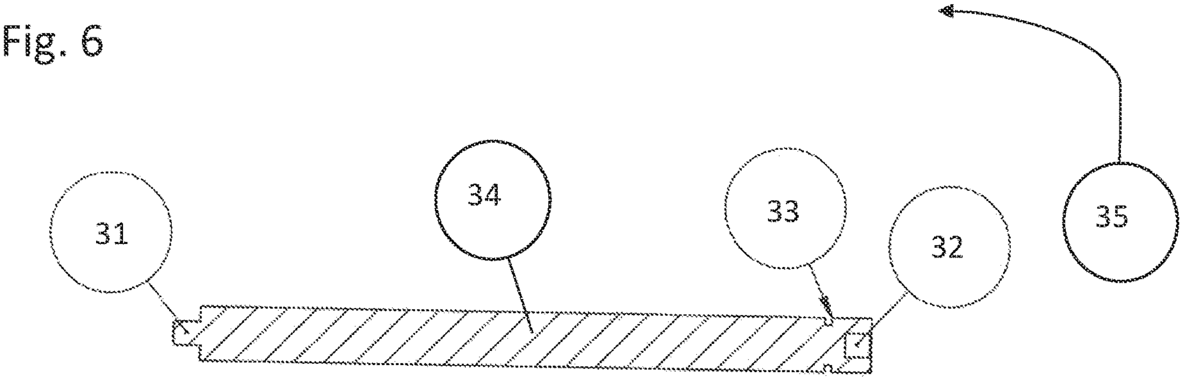
FIG. 6 is a cut out view of the shortened rod.
Figure 7:
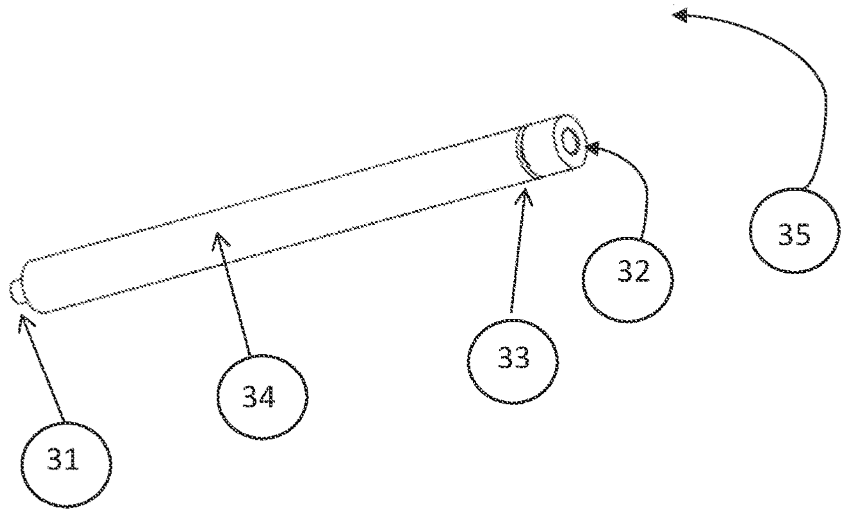
FIG. 7 is a perspective view of the shortened rod.

Referring now to the invention shown in FIG. 6-7. In this embodiment, the shortened rod (35) comprises, the male connection (31), the female connection (32), the thumb lock groove (33), and a main length section (34). The shortened rod can be used alone but works better in groups of two or more as it is intended to be ½ or less the length of the caulking gun from the front of the tube housing to the back of the trigger handle, but longer than the distance from where the thumb lock groove mechanism (17) should meet with the shortened rod and the front of the handle. Said group of two or more shortened rods can be a set of rods with each rod being substantial in size but not necessarily the same size as the shortened rod (31) contiguous with the flat round disk of the plunger. The male connection (31) is generally threaded, but a push lock system can be imagined, and can connect to either the plunger tip which is shaped like a pie pan with a female nut attached to the middle, or the female connection of another shortened rod. Both the male connection (31) and the female connection (32) are threaded and given groove patterns such that they will connect and reversibly bind to each other.

Referring now to the invention shown in FIG. 6-7 the main length (34) of the shortened rod (35), from the male connection (31) to the thumb lock groove (33) is longer than the distance from the back of the tube housing to the back of the trigger handle when on the middle axis of the tube when placed in the tube housing. The thumb lock groove (33) is wide enough for the thumb lock mechanism to easily slide into it as the shortened rod is worked into an adjacent position. It is imagined that the thumb lock groove would have serrations or imperfections in the circular structure wherein when another shortened rod is pushed up to it and rotated the shortened rod would catch and ease the joining of the male and female ends of the two shortened rods together.

Further referring now to the invention shown in FIG. 2, it is anticipated that there will be clips or other mechanisms to allow for the placement of the extra or spare shortened rods.

In broad embodiment, the present invention is a device for an application of viscous liquids, or pastes, comprising; a barrel with a cavity for the insertion of a tube of viscous liquids, or pastes, a handle and a trigger with catch and stabilizer for moving a short piston rod and a release for pulling the piston rod back, a plunger with a pan shaped disk removably attached to the center of the plunger wherein the piston rod is a small stabilizer rod that is positioned in a line with the hole in the back of the barrel and the back of the handle.

The advantages of the present invention include, without limitation allowing for the unencumbered use of the caulking gun in restricted space environments. A smaller and more compact caulk gun which allows the caulk to be laid at more precise angles than a larger caulk gun of the prior art would. The use of a set of shortened rods with the plunger assembly permits pressure to be applied to the plunger assembly applying caulk or adhesive without significant clearance behind the caulk gun where the rod would have been.

Since certain changes may be made in the above apparatus without departing from the scope of the invention herein, it is intended that all matter contained in the above description and shown in the accompanying drawings shall be interpreted as illustrative only, and not in a limiting sense.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

The invention claimed is:

1. A caulk gun with a segmented plunger assembly, comprising:

a handle connected to a tube housing, a trigger with a levered connection with a frictional tab and a thumb lock mechanism; and two or more rods with a male to female connection, wherein the segmented plunger assembly passes through a hole in the back of the tube housing, the frictional tab, and a hole a back of the handle, a front end of the segmented plunger assembly being located within the tube housing with the male to female connection configured for a flat round plunger, wherein a motion of the segmented plunger assembly is regulated by the thumb lock mechanism and a thumb lock groove, the thumb lock groove being located near the back of each rod, the thumb lock mechanism being located on the outside of the back of the handle.

2. The caulk gun with the segmented plunger assembly of claim 1, wherein when the trigger is pulled, the frictional tab pushes the segmented plunger assembly forward into the tube housing.

3. The caulk gun with the segmented plunger assembly of claim 1, wherein each rod has a length of greater than ⅔ a length from a back of the handle to a front of the tube housing and additional rods included for attachment to a back end of the segmented plunger assembly.

4. The caulk gun with a segmented plunger assembly of claim 3, wherein the male to female connection comprises a male connection and a female connection on opposite sides of each rod, wherein the male connection and the female connection comprise short threaded cylinders of complimentary junctions.

5. The caulk gun of claim 4, wherein the trigger activates a mode in which the segmented plunger assembly is released from the frictional tab to allow for pulling back of the segmented plunger assembly.

6. The caulk gun with the segmented plunger assembly of claim 1, wherein the thumb lock mechanism enables the segmented plunger assembly to be pulled out of the tube.

7. The caulk gun with a segmented plunger assembly of claim 1, wherein; the hole in the back of the tube housing is positioned in a line with a spring, an opening for a frictional tab, and a hole in the back of the handle.

* * * * *